UNITED STATES PATENT OFFICE.

RUDOLF ZAERTLING AND HERMANN FRIEDRICH, OF LEVERKUSEN, GERMANY, ASSIGNORS TO FARBENFABRIKEN VORM. FRIEDR. BAYER & CO., OF ELBERFELD, GERMANY, A CORPORATION.

DIPHENYLENE DIOXID.

981,348.  Specification of Letters Patent.  Patented Jan. 10, 1911.

No Drawing.    Application filed May 5, 1910.  Serial No. 559,490.

*To all whom it may concern:*

Be it known that we, RUDOLF ZAERTLING and HERMANN FRIEDRICH, doctors of philosophy, chemists, citizens of the German Empire, residing at Leverkusen, near Cologne, Germany, have invented new and useful Improvements in Processes for Producing Diphenylene Dioxid, of which the following is a specification.

Our invention relates to a new process for producing diphenylene dioxid, which process consists in heating a salt of ortho-chlorophenol.

In order to illustrate the new process more fully the following example is given, the parts being by weight:—Dry ortho-chlorophenol (potassium salt) obtainable by evaporating 256 parts of ortho-chlorophenol and 232 parts of KOH (49.8 per cent.) is slowly heated in an iron retort above 220° C. In the vacuo under a pressure of 20–30 mm. the diphenylene dioxid distils over. It forms after cooling long needles. After being washed with a 5 per cent. solution of NaOH and water it melts at 118–119° C. It is insoluble in water and alcohol, and is formed probably according to the following equation:

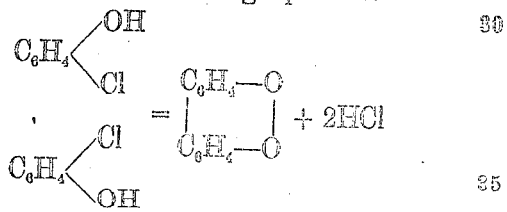

It is a valuable intermediate compound for the manufacture of dyes. Other salts *i. e.* of ortho-chlorophenol *e. g.* the sodium salt can be used.

We claim:

The herein described process of producing diphenylene dioxid, which process consists in heating a salt of ortho-chlorophenol and distilling off the resulting product using a vacuum.

In testimony whereof we have hereunto set our hands in the presence of two subscribing witnesses.

RUDOLF ZAERTLING.  [L. S.]
  HERMANN FRIEDRICH. [L. S.]

Witnesses: